United States Patent
Yoshimura

(10) Patent No.: US 9,447,711 B2
(45) Date of Patent: Sep. 20, 2016

(54) METHOD FOR PRODUCTION OF VALVE HEAD PORTION OF HOLLOW ENGINE VALVE AND HOLLOW ENGINE VALVE

(71) Applicant: MITSUBISHI HEAVY INDUSTRIES, LTD., Tokyo (JP)

(72) Inventor: Hyoji Yoshimura, Nagoya (JP)

(73) Assignees: FUJI HOLLOW VALVE INC., Shizuoka (JP); YOSHIMURA COMPANY, Aichi (JP)

( * ) Notice: Subject to any disclaimer, the term of this patent is extended or adjusted under 35 U.S.C. 154(b) by 176 days.

(21) Appl. No.: 13/955,635

(22) Filed: Jul. 31, 2013

(65) Prior Publication Data

US 2013/0313463 A1    Nov. 28, 2013

Related U.S. Application Data

(62) Division of application No. 13/119,501, filed as application No. PCT/JP2009/066285 on Sep. 17, 2009, now Pat. No. 8,522,434.

(30) Foreign Application Priority Data

Sep. 18, 2008 (JP) .................. 2008-239082
Oct. 22, 2008 (JP) .................. 2008-272079

(51) Int. Cl.
B23P 15/00    (2006.01)
B21D 53/84    (2006.01)
(Continued)

(52) U.S. Cl.
CPC .............. *F01L 3/16* (2013.01); *B21D 53/84* (2013.01); *B21K 1/22* (2013.01); *B23K 11/0935* (2013.01);
(Continued)

(58) Field of Classification Search
CPC .......... B23P 11/00; B23P 15/00; B23P 19/02; B23P 2700/02; B23P 15/14; B25B 11/00; F01L 1/047; F01L 2001/0471; F01L 2001/0475; F01L 2103/00; F16C 3/023; Y10T 74/2101; Y10T 29/49293
See application file for complete search history.

(56) References Cited

U.S. PATENT DOCUMENTS 1,691,779 A * 11/1928 McDonald .................... 219/107
1,992,245 A * 2/1935 Scrimgeour ............. 29/888.451
(Continued)

FOREIGN PATENT DOCUMENTS

DE     560 343       9/1932
DE   1 027 488 B   10/1952
(Continued)

OTHER PUBLICATIONS

Notice of Allowance mailed May 18, 2015 for related U.S. Appl. No. 13/955,815.
(Continued)

*Primary Examiner* — Alexander P Taousakis
(74) *Attorney, Agent, or Firm* — Birch, Stewart, Kolasch & Birch, LLP

(57) ABSTRACT

Forming of a valve head portion (1) of a hollow engine valve (V) comprising a material particularly satisfactory in heat resistance is performed by cold forging. The material with excellent heat resistance is worked to form a valve head portion semifinished product (11) having a hollow hole (S11) whose inner diameter ($\phi 11$) is equal to the maximum inner diameter ($\phi 11$) of a hollow hole (S1) of a finished product of the valve head portion (1), and having a diameter-increased section (111) whose maximum outer diameter ($\phi 12$) is equal to the maximum outer diameter ($\phi 12$) of a diameter-increased section (1a) of the finished product. Parts of the valve head portion semifinished product other than a central part to a lower part of the diameter-increased section (111) are necked down by cold forging performed a plurality of times to obtain the finished product of the valve head portion (1).

7 Claims, 7 Drawing Sheets

(51) Int. Cl.
*B21K 1/22* (2006.01)
*B23K 11/093* (2006.01)
*F01L 3/16* (2006.01)
*F01L 3/14* (2006.01)

(52) U.S. Cl.
CPC ............... *B23P 15/002* (2013.01); *F01L 3/14* (2013.01); *F01L 2103/00* (2013.01); *Y10T 29/49307* (2015.01); *Y10T 29/49309* (2015.01); *Y10T 29/49405* (2015.01)

(56) References Cited

U.S. PATENT DOCUMENTS

| | | | | |
|---|---|---|---|---|
| RE20,014 | E | * | 6/1936 | Scrimgeour ............... 123/188.3 |
| 2,093,773 | A | * | 9/1937 | Colwell .................. 29/888.451 |
| 2,093,774 | A | * | 9/1937 | Colwell .................. 29/888.452 |
| 2,392,152 | A | * | 1/1946 | Johnson .................. 29/888.45 |
| 3,040,417 | A | * | 6/1962 | Newton .................. 29/888.452 |
| 3,286,704 | A | | 11/1966 | Danis |
| 3,710,773 | A | * | 1/1973 | Piech et al. ............... 123/188.3 |
| 3,793,873 | A | | 2/1974 | Iwata et al. |
| 4,406,046 | A | * | 9/1983 | Adam et al. ............... 29/888.45 |
| 4,450,798 | A | * | 5/1984 | Jessel ......................... 123/41.41 |
| 4,779,584 | A | | 10/1988 | Mosler |
| 5,056,219 | A | * | 10/1991 | Iwase ...................... 29/888.451 |
| 5,413,073 | A | * | 5/1995 | Larson et al. ............. 123/188.3 |
| 5,458,314 | A | * | 10/1995 | Bonesteel .................... 251/337 |
| 5,619,796 | A | | 4/1997 | Larson |
| 6,006,713 | A | * | 12/1999 | Gebauer ................... 123/188.3 |
| 6,354,001 | B1 | | 3/2002 | Asanuma |
| 6,378,543 | B1 | * | 4/2002 | Murayama ................ 137/15.18 |
| 8,522,434 | B2 | | 9/2013 | Yoshimura |
| 2003/0121488 | A1 | * | 7/2003 | Abele et al. ............. 123/188.3 |
| 2007/0040144 | A1 | * | 2/2007 | Abele et al. ................. 251/356 |
| 2007/0125976 | A1 | * | 6/2007 | Stark et al. .................. 251/356 |
| 2007/0277769 | A1 | * | 12/2007 | Kishihara et al. ......... 123/188.3 |
| 2008/0006793 | A1 | * | 1/2008 | Hirnschal .................... 251/356 |
| 2009/0266314 | A1 | * | 10/2009 | Uchiyama et al. ......... 123/41.16 |
| 2012/0246934 | A1 | | 10/2012 | Morii et al. |
| 2014/0033533 | A1 | * | 2/2014 | Morii ....................... B21K 1/22 29/890.12 |
| 2014/0239218 | A1 | * | 8/2014 | Kroos et al. .................. 251/366 |

FOREIGN PATENT DOCUMENTS

| | | |
|---|---|---|
| DE | 1 031 614 B | 6/1956 |
| EP | 1 462 621 A1 | 9/2004 |
| EP | 1 640 086 A1 | 3/2006 |
| FR | 47 188 | 2/1937 |
| GB | 370641 | 3/1931 |
| GB | 399295 | 7/1932 |
| GB | 1011486 | 1/1963 |
| JP | 49-103877 A | 10/1974 |
| JP | 52-130467 A | 11/1977 |
| JP | 63-195308 A | 8/1988 |
| JP | 5-106413 A | 4/1993 |
| JP | 7-102917 A | 4/1995 |
| JP | 7-119421 A | 5/1995 |
| JP | 7-208127 A | 8/1995 |
| JP | 8-117904 A | 5/1996 |
| JP | 10-323735 A | 12/1998 |
| JP | 2002-45935 A | 2/2002 |
| JP | 2006-88197 A | 4/2006 |
| JP | 2008-528873 A | 7/2008 |
| JP | 2009-185655 A | 8/2009 |
| KP | 10-1998-068150 A | 10/1998 |

OTHER PUBLICATIONS

European patent Office Communication together with a Third Party Communication and English translation. Dated Jan. 3, 3013.
Extended European Search Report dated May 23, 2013 for Application No. 09 81 4643.
Korean Notice of Allowance for corresponding Korean Application No. 10-2011-7006196 dated Jan. 3, 2013 with English Translation.

* cited by examiner

Fig.6

| Material Group A | Material Group B | Material Group C |
|---|---|---|
| Mainly used in valve head portion | Mainly used in hollow shaft portion | Mainly used in shaft end sealing material |
| NCF47W<br>SUH35<br>Inconel 751 | SUS304<br>SUS430<br>SUH11 | SUH11 |

● Proportions of main components in each material (except iron; unit, %)

NCF47W

| C | Si | Mn | Cu | Ni | Cr | W | Nb | Al | Ti | ATL | B |
|---|---|---|---|---|---|---|---|---|---|---|---|
| 0.01<br>~<br>0.05 | 0.5<br>or less | 0.5<br>or less | 0.3<br>~<br>1.0 | 45.0<br>~<br>50.0 | 23.5<br>~<br>25.0 | 1.0<br>~<br>2.0 | 0.7<br>~<br>1.0 | 1.2<br>~<br>2.0 | 2.0<br>~<br>3.0 | 4.5<br>~<br>5.5 | 0.001<br>~<br>0.01 |

ATL : Al+Ti+Nb

SUH35

| C | Si | Mn | P | S | Ni | Cr | N |
|---|---|---|---|---|---|---|---|
| 0.48<br>~<br>0.58 | 0.35<br>or less | 8.00<br>~<br>10.00 | 0.04<br>or less | 0.03<br>or less | 3.25<br>~<br>4.50 | 20.00<br>~<br>22.00 | 0.35<br>~<br>0.50 |

Inconel 751

| C | Cr | Ti | Ni | Al | Nb |
|---|---|---|---|---|---|
| 0.05 | 15.0<br>~<br>16.0 | 2.3<br>~<br>2.5 | 70.0<br>~<br>72.5 | 0.9<br>~<br>1.2 | 1.0 |

SUS304

| C | Si | Mn | P | S | Ni | Cr |
|---|---|---|---|---|---|---|
| 0.08<br>or less | 1.00<br>or less | 2.00<br>or less | 0.04<br>or less | 0.03<br>or less | 8.00<br>~<br>11.00 | 18.00<br>~<br>20.00 |

SUS430

| C | Si | Mn | P | S | Ni | Cr |
|---|---|---|---|---|---|---|
| 0.12<br>or less | 0.75<br>or less | 1.00<br>or less | 0.04<br>or less | 0.03<br>or less | 0.60<br>or less | 16.00<br>~<br>18.00 |

SUS11

| C | Si | Mn | P | S | Ni | Cr |
|---|---|---|---|---|---|---|
| 0.45<br>~<br>0.55 | 1.00<br>~<br>2.00 | 0.60<br>or less | 0.03<br>or less | 0.03<br>or less | * | 7.50<br>~<br>9.50 |

＊ Ni (0.6% or less) may be contained

METHOD FOR PRODUCTION OF VALVE HEAD PORTION OF HOLLOW ENGINE VALVE AND HOLLOW ENGINE VALVE

This application is a Divisional of co-pending U.S. patent application Ser. No. 13/119,501 filed on Apr. 6, 2011 which is a National phase of PCT/JP2009/066285 filed on Sep. 17, 2009, which claims priority under 35 U.S.C. §119(a) to Patent Application JP 2008-239082 filed in Japan on Sep. 18, 2008 and to Patent Application JP 2008-272079 filed in Japan on Oct. 22, 2008, all of which are hereby expressly incorporated by reference in their entirety.

TECHNICAL FIELD

This invention relates to a method for production of a valve head portion of a hollow engine valve; and the hollow engine valve having the valve head portion. The valve head portion comprises a material having heat resistance comparable to or better than the heat resistance of a material for a hollow shaft portion, and the valve head portion has a valve head portion hollow hole opening on a side welded to the hollow shaft portion. The valve head portion hollow hole is formed to have an increased diameter in a diameter-increased section of the valve head portion, and the maximum inner diameter of the valve head portion hollow hole is larger than the maximum outer diameter of the hollow shaft portion.

BACKGROUND ART

For the production of a hollow engine valve, three members thereof, i.e., a valve head portion, a hollow shaft portion, and a shaft end sealing material, are prepared separately, and these three members are finally joined together by welding to obtain a hollow engine valve as a finished product. This technology has so far been performed, as disclosed in Patent Document 1 to be described below. It has also been performed to join a valve head portion and a hollow shaft portion, which has one end sealed, by welding, thereby obtaining a hollow engine valve as a finished product. Sodium is sealed up in or enclosed in a hollow hole of a hollow engine valve for an exhaust valve required to show high-temperature resistance, and takes charge of cooling in regions of the engine valve, where the temperature is particularly high, ranging from the valve head portion to a section of the hollow shaft portion closer to the valve head portion. As the shape of the hollow hole of the hollow engine valve, therefore, a shape having a diameter increased inside the valve head portion, as shown in FIG. 1 of Patent Document 2 to be described later, is more desirable than a simple cylindrical shape as seen in FIGS. 2 and 3 of the Patent Document 1 described later.

With the conventional hollow engine valve, especially, the hollow engine valve for exhaust which is exposed to high temperatures, it has been common practice to use a material showing excellent characteristics involving heat resistance, such as a manganese-based heat resisting steel, or a nickel-based heat resisting steel, in the valve head portion where the temperature is highest; use an ordinary steel material or an ordinary heat resisting steel material for the hollow shaft portion or the shaft end sealing material where the temperature is not so high; and weld the three members, i.e., the valve head portion, hollow shaft portion, and shaft end sealing material, or the two members, i.e., the valve head portion and the hollow shaft portion sealed at one end, thereby constructing a finished product of a hollow engine valve. Alternatively, if particularly excellent heat resistance is required, a method of using a material showing excellent characteristics involving heat resistance for the hollow shaft portion, as for the valve head portion, has been performed.

Essentially, it is ideal to produce the entire hollow engine valve from any of the above-mentioned materials showing characteristics including excellent heat resistance. However, these materials are expensive, hard, and poor in work characteristics or workability. Thus, these materials are used only for the valve head portion where the temperature is particularly high, and an ordinary steel plate is applied to the hollow shaft portion or the shaft end sealing material where the temperature is not very high. With the methods for producing hollow engine valves, therefore, numerous technological developments have been made, particularly, in regard to the method for production of the valve head portion. There are not many cases of using the material showing characteristics including excellent heat resistance for the hollow shaft portion as well. Thus, emphasis will hereinafter be placed on technologies concerned with methods for producing the valve head portion which, in the exhaust valve, needs to use the material showing characteristics including excellent heat resistance and whose forming is difficult.

In the production of the valve head portion of the hollow engine valve, the point of development concentrates on two areas. The first area is a method of producing the leading end diameter-increased section of the valve head portion, and the second area is a technology on a method of providing a hollow hole in the valve head portion. That is, the material used for the valve head portion is excellent in heat resistance, but poor in workability, as mentioned above. Thus, when the leading end diameter-increased section is to be formed, or when the hollow hole is to be provided, a high degree of difficulty in working has to be overcome in comparison with the working of an ordinary steel material. In this connection, various inventions and devices have been accomplished thus far.

In the Patent Document 1, "a hollow valve formed by rolling up a steel plate" does not touch on details of the method for production of the valve head portion, but merely describes "forging". Since the hollow hole therein is in a cylindrical shape, it is assumed to have been formed using a punch or a drill.

In "a method for production of a Na-filled hollow engine valve" disclosed in the Patent Document 2, "hot plastic working" is described as being used to form the diameter-increased section of the valve head portion, and "hot isostatic pressing" is described as being used to form the hollow hole. It follows, therefore, that "hot forging" forms both of them. In the invention of the Patent Document 2, "a round material of a larger diameter than the diameter of the valve shaft" is described as being used as the material for the valve head portion, and the inner diameter of the hollow hole is described as being initially "larger than the inner diameter of the finished valve hollow portion". In FIG. 1 of the Patent Document 2, the initial inner diameter of the hollow hole is further increased during the hot forging process of the valve head portion, and the hollow hole increased in diameter is depicted as being provided inside the diameter-increased section of the valve head portion. In the actual forging process, however, it is very difficult to increase the diameter of the hollow hole to a dimension equal to or larger than the inner diameter of the hollow hole initially bored, thereby forming the hollow hole into an appropriate shape. Actually, the hollow hole is not increased in diameter, unlike that depicted in FIG. 1 of the Patent Document 2.

In "a method for production of a Na-filled hollow engine valve" disclosed in Patent Document 3 to be described later, the leading end of a pipe is first forged into a spherical form, and then formed into an umbrella shape, according to the first invention and the second invention of this document. The leading end diameter-increased section of the valve head portion is formed by this method, and this method of forming is hot forging. The difference exists that the hollow pipe remains as such in the first invention, while a highly machinable material is sealed up in the hollow portion in the second invention. The third invention, on the other hand, starts with a pipe having a highly machinable material enclosed in its hollow portion, the pipe having a larger diameter than the diameter of a hollow shaft portion to be formed, and forms one end of the pipe into an umbrella shape, and the other end of the pipe into the shape of a thin pipe. The method of forming is hot forging for both ends.

As far as the formation of the hollow hole is concerned, the first invention has the hollow hole from the start, whereas the second invention and the third invention form the hollow hole by cutting and removing the highly machinable material enclosed in the hollow portion. In all of the first to third inventions, the center of the leading end diameter-increased section of the valve head portion is lacking in the material with high resistance to heat. These inventions, however, adopt a method in which the highly heat resistant material is welded to this central part in the final process, whereby the entire outside of the leading end diameter-increased section is formed as comprising the highly heat resistant material.

In "a method for producing a Na-filled hollow engine valve" disclosed in Patent Document 4 to be described below, the valve head portion is of a conglomerate form (first invention) or in the form of a round bar (second invention), and is characterized by having a shallow hole in an end part thereof joined to the hollow shaft portion. That is, the highly heat resistant material constituting the valve head portion has poor machinability. Thus, only the shallow hole is bored, and the hollow shaft portion is welded to the bored part to form a continuous hollow hole, whereafter the valve head portion is formed into an umbrella shape. The steps of forming the valve head portion are performed by hot forging. Drawbacks characteristic of this method are as follows: The hollow hole bored in the valve head portion is the shallow hole. In the hollow engine valve as the finished product, therefore, the site of welding between the valve head portion and the hollow shaft portion is in the close vicinity of the diameter-increased section of the valve head portion, and is exposed to considerably high temperatures during the operation of the engine. This arouses concern about strength.

PRIOR ART DOCUMENTS

Patent Documents

Patent Document 1: JP-A-63-195308
Patent Document 2: JP-A-7-102917
Patent Document 3: JP-A-7-119421
Patent Document 4: JP-A-7-208127

SUMMARY OF THE INVENTION

Problems to be Solved by the Invention

As far as the above-mentioned conventional technologies are concerned, hot forging is used for the formation of the valve head portion. For the formation of the hollow hole, the first step is to enclose the highly machinable material within the pipe of the highly heat resistant material, and the finishing step is to cut the highly machinable material by a gun drill or the like, thereby providing the hollow hole. Alternatively, the highly heat resistant material is used in the form of a pipe from the beginning to utilize its hollow hole unchanged. Furthermore, the hollow hole of the valve head portion is formed as a shallow hole, and a pipe composed of ordinary steel is connected to the valve head portion to complete the hollow hole. As seen here, various contrivances have been tried in order to overcome the minimal workability of the highly heat resistant material of the valve head portion.

In connection with the use of hot forging for the formation of the valve head portion, however, the following problems have been pointed out: In the case of hot forging, the temperature of the material has to be raised to a value of the order of 850° C. to 1,200° C., thus requiring facilities for this purpose. Also, time is taken for cooling, so that labor is increased for working. Moreover, hot forging, which involves the problem of metal expansion or the like, cannot be expected to achieve working accuracy as high as that of cold forging. Furthermore, the texture of the surface of the resulting product is poor compared with that in cold forging.

Hence, it is ideal that the forming of the valve head portion by working should be performed, in essence, by cold forging, or warm forging, at most. For the valve head portion of the hollow engine valve as an exhaust valve, in particular, use has to be made of manganese-based or nickel-based steel materials with excellent heat resistance. However, such materials are so hard that they are markedly inferior in workability, as stated above, and it has been considered impossible to form them into the finished shape of the valve head portion by cold forging.

These facts are also described explicitly in the Patent Document 3 (paragraph 0006) and the Patent Document 4 (paragraph 0008). The relevant descriptions in the Patent Document 4 will be cited below.

"With SUH35 (21% Cr-4% Ni-9% Mn steel), which becomes mainstream for exhaust valves, Mn is contained in a large amount during cold working at the time of finishing. Thus, work hardening occurs, making pipe formation extremely difficult. Current technologies for pipe formation cause fine cracks or ruptures during cold formation of pipes having an outer diameter of 10 mm or less, thereby presenting a bottleneck in their practical use."

The expression of the components of SUH35 in the above citation is the same as the expression in the Patent Document 4.

The formation of the hollow hole also poses various problems. The hollow hole in the valve head portion should desirably be not of a simple cylindrical form of the same cross-section, but be increased in diameter in the interior of the leading end diameter-increased section, where the temperature is the highest, in correspondence with the diameter-increased shape of the external surface. This is the case, needless to say, from the point of view of the cooling action of sodium enclosed in the hollow hole. In the state where the shallow hole is bored, however, it is impossible to increase the diameter of the hollow hole within the leading end diameter-increased section, as observed in the invention of the Patent Document 4. If, instead, the material for the valve head portion is rendered of a pipe shape from the beginning, as in the invention of the Patent Document 3, the final step has to be to weld a highly heat resistant material separately to the leading end of the pipe. This is laborious, and concern about strength due to welding remains unsolved, because the leading end diameter-increased section of the valve head portion is a site exposed to particularly high temperatures. Besides, in the invention of the Patent Document 2, the hollow hole of the leading end diameter-increased section of the valve head portion does not become the one illustrated in FIG. 1 of the Patent Document 2, as discussed earlier.

Based on the foregoing, the problems with or targets for the present invention have been set as follows:

<Target 1>

To develop a method for forming the valve head portion, which comprises a material having heat resistance comparable to or better than that of the material for the hollow shaft portion in a hollow engine valve, by cold forging.

<Target 2>

To obtain a hollow hole increased in diameter in the leading end diameter-increased section of the valve head portion comprising the above material such that the maximum inner diameter of the hollow hole is larger than at least the outer diameter of a rear end part of the valve head portion, namely, a junction with the hollow shaft portion.

Means for Solving the Problems

The present invention has been accomplished to solve the problems as means for reaching the targets, and provides the following solutions:

<Solution 1>

A method for production of a valve head portion of a hollow engine valve, in which the hollow engine valve has a hollow shaft portion, and the valve head portion comprising a material having heat resistance comparable to or better than heat resistance of a material for the hollow shaft portion, the valve head portion has a valve head portion hollow hole opening on a side welded to the hollow shaft portion, the valve head portion hollow hole is formed to have an increased diameter in a diameter-increased section of the valve head portion, and a maximum inner diameter of the valve head portion hollow hole is larger than a maximum outer diameter of the hollow shaft portion, the method comprising:

a first step of producing a valve head portion semifinished product by working the material having the heat resistance comparable to or better than the heat resistance of the material for the hollow shaft portion to form the valve head portion semifinished product, in which the valve head portion semifinished product has a cylindrical barrel section and a diameter-increased section at one end of the barrel section, the diameter-increased section being integral with the barrel section, when the diameter-increased section is located below, a maximum outer diameter of the diameter-increased section is equal to a maximum outer diameter of the diameter-increased section of the valve head portion as a finished product, and the valve head portion semifinished product has a cylindrical hollow hole having an inner diameter equal to the maximum inner diameter of the valve head portion hollow hole of the finished product, the cylindrical hollow hole opening at an upper end, and having a lower end bottomed in the diameter-increased section, the first step including:

using a cylindrical solid round bar as a material, the solid round bar comprising the material having the heat resistance comparable to or better than the heat resistance of the material for the hollow shaft portion, the solid round bar having a diameter larger than a minimum outer diameter of the valve head portion as the finished product, but smaller than a maximum outer diameter of the valve head portion as the finished product;

while rendering a circular surface at one end of the solid round bar an upper surface, and a circular surface at another end of the solid round bar a lower surface, forming a cylindrical hollow hole opening at an upper end, and being bottomed at a lower end, an inner diameter of the cylindrical hollow hole being equal to the maximum inner diameter of the valve head portion hollow hole of the valve head portion as the finished product; and then increasing a diameter of a lower part of the solid round bar by forging to bring a maximum outer diameter of the lower part into conformity with the maximum outer diameter of the diameter-increased section of the valve head portion as the finished product, thereby producing the valve head portion semifinished product having the diameter-increased section whose maximum outer diameter coincides with the maximum outer diameter of the diameter-increased section of the valve head portion as the finished product, the valve head portion semifinished product having the cylindrical hollow hole having the inner diameter equal to the maximum inner diameter of the valve head portion hollow hole of the valve head portion as the finished product, the cylindrical hollow hole having the lower end bottomed; and a second step of gradually necking down an upper part of the diameter-increased section and the barrel section of the valve head portion semifinished product by cold forging in a plurality of stages, that is, gradually necking down the upper part of the diameter-increased section and the barrel section by use of dies for pressing the upper part of the diameter-increased section and the barrel section, inner diameters of the dies being decreased little by little as the stage advances, a number of the dies used being equal to a number of processes for necking, thereby obtaining the valve head portion as the finished product configured such that the maximum inner diameter of the valve head portion hollow hole in the diameter-increased section is maintained at the inner diameter of the cylindrical hollow hole, the inner diameter of the valve head portion hollow hole being decreased with increasing height and being equal to an inner diameter of a hollow hole of the hollow shaft portion at an upper end of the barrel section.

<Solution 2>

A method for production of a valve head portion of a hollow engine valve, in which the hollow engine valve has a hollow shaft portion, and the valve head portion comprising a material having heat resistance comparable to or better than heat resistance of a material for the hollow shaft portion, the valve head portion has a valve head portion hollow hole opening on a side welded to the hollow shaft portion, the valve head portion hollow hole is formed to have an increased diameter in a diameter-increased section of the valve head portion, and a maximum inner diameter of the valve head portion hollow hole is larger than a maximum outer diameter of the hollow shaft portion, the method comprising: a first step of producing a valve head portion semifinished product by working the material having the heat resistance comparable to or better than the heat resistance of the material for the hollow shaft portion to form the valve head portion semifinished product, in which the valve head portion semifinished product has a cylindrical barrel section and a diameter-increased section at one end of the barrel section, the diameter-increased section being integral with the barrel section, when the diameter-increased section is located below, a maximum outer diameter of the diameter-increased section is equal to a maximum outer diameter of the diameter-increased section of the valve head portion as a finished product, and the valve head portion semifinished product has a cylindrical hollow hole having an inner diameter equal to the maximum inner diameter of the valve head portion hollow hole of the finished product, the cylindrical hollow hole opening at an upper end, and having a lower end bottomed in the diameter-increased section, the first step including:

using a cylindrical solid round bar as a material, the solid round bar comprising the material having the heat resistance comparable to or better than the heat resistance of the material for the hollow shaft portion, the solid round bar having a diameter larger than a minimum outer diameter of the valve head portion as the finished product, but smaller than a maximum outer diameter of the valve head portion as the finished product;

while rendering a circular surface at one end of the solid round bar an upper surface, and a circular surface at another end of the solid round bar a lower surface, increasing a diameter of a lower part of the solid round bar by forging to bring a maximum outer diameter of the lower part into conformity with the maximum outer diameter of the diameter-increased section of the valve head portion as the finished product, then forming a cylindrical hollow hole opening at an upper end, and being bottomed at a lower end, an inner diameter of the cylindrical hollow hole being equal to the maximum inner diameter of the valve head portion hollow hole of the valve head portion as the finished product; and thereby producing the valve head portion semifinished product having the diameter-increased section whose maximum outer diameter coincides with the maximum outer diameter of the diameter-increased section of the valve head portion as the finished product, the valve head portion semifinished product having the cylindrical hollow hole having the inner diameter equal to the maximum inner diameter of the valve head portion hollow hole of the valve head portion as the finished product, the cylindrical hollow hole having the lower end bottomed; and a second step of gradually necking down an upper part of the diameter-increased section and the barrel section of the valve head portion semifinished product by cold forging in a plurality of stages, that is, gradually necking down the upper part of the diameter-increased section and the barrel section by use of dies for pressing the upper part of the diameter-increased section and the barrel section, inner diameters of the dies being decreased little by little as the stage advances, a number of the dies used being equal to a number of processes for necking, thereby obtaining the valve head portion as the finished product configured such that the maximum inner diameter of the valve head portion hollow hole in the diameter-increased section is maintained at the inner diameter of the cylindrical hollow hole, the inner diameter of the valve head portion hollow hole being decreased with increasing height and being equal to an inner diameter of a hollow hole of the hollow shaft portion at an upper end of the barrel section.

<Solution 3>

The method for production of a valve head portion of a hollow engine valve according to Solution 1 or Solution 2, further comprising, in the second step:

installing a ram where the dies are fixed, and a press bed where works are fixed, at spaced locations with the ram being located above and the press bed being located below;

fixing N of the dies, which corresponds to a number of the processes (N of the processes) for cold forging, at equally spaced intervals to the ram in a sequence of the processes for necking, N being a positive integer and N≥2;

locating the valve head portion semifinished products on the press bed such that a first of the valve head portion semifinished products lies below a first of the dies;

lowering the ram to perform first forging of the first valve head portion semifinished product for necking by the first die;

raising the ram, and transfer-moving the first valve head portion semifinished product to be located below a second of the dies, and simultaneously locating a second of the valve head portion semifinished products below the first die;

lowering the ram to perform second forging of the first valve head portion semifinished product for necking by the second die, and simultaneously perform first forging of the second valve head portion semifinished product for necking by the first die;

raising the ram, and transfer-moving the first valve head portion semifinished product to be located below a third of the dies, and the second valve head portion semifinished product to be located below the second die, and simultaneously locating a third of the valve head portion semifinished products below the first die;

lowering the ram N times and transfer-moving a plurality of the valve head portion semifinished products, in such a manner, and when the first valve head portion semifinished product becomes a valve head portion finished product as a first valve head portion finished product, removing the first valve head portion finished product from the press bed; and further continuing the processes to obtain a plurality of the valve head portion finished products.

<Solution 4>

The method for production of a valve head portion of a hollow engine valve according to Solution 1 or Solution 2, further comprising, in the second step:

installing a ram where the dies are fixed, and a press bed where works are fixed, at spaced locations with the ram being located below and the press bed being located above;

fixing N of the dies, which corresponds to a number of the processes (N of the processes) for cold forging, at equally spaced intervals to the ram in a sequence of the processes for necking, N being a positive integer and N≥2;

locating the valve head portion semifinished products on the press bed such that a first of the valve head portion semifinished products lies above a first of the dies;

raising the ram to perform first forging of the first valve head portion semifinished product for necking by the first die;

lowering the ram, and transfer-moving the first valve head portion semifinished product to be located above a second of the dies, and simultaneously locating a second of the valve head portion semifinished products above the first die;

raising the ram to perform second forging of the first valve head portion semifinished product for necking by the second die, and simultaneously perform first forging of the second valve head portion semifinished product for necking by the first die;

lowering the ram, and transfer-moving the first valve head portion semifinished product to be located above a third of the dies, and the second valve head portion semifinished product to be located above the second die, and simultaneously locating a third of the valve head portion semifinished products above the first die;

raising the ram N times and transfer-moving a plurality of the valve head portion semifinished products, in such a manner, and when the first valve head portion semifinished product becomes a valve head portion finished product as a first valve head portion finished product, removing the first valve head portion finished product from the press bed; and further continuing the processes to obtain a plurality of the valve head portion finished products.

<Solution 5>

A hollow engine valve, comprising:
a hollow shaft portion opening at both ends;
a valve head portion produced by the method for production according to Solution 1 or Solution 2 or Solution 3 or Solution 4 and welded to one of the ends of the hollow shaft portion; and
a shaft end sealing material welded to the other end of the hollow shaft portion.

<Solution 6>

A hollow engine valve, comprising:
a hollow shaft portion sealed at one end; and
a valve head portion produced by the method for production according to Solution 1 or Solution 2 or Solution 3 or Solution 4 and welded to another end of the hollow shaft portion.

Effects of the Invention

According to the invention as Solution 1 or Solution 2, the method of the present invention has the first step of producing a valve head portion semifinished product by working a material having heat resistance comparable to or better than the heat resistance of the material for a hollow shaft portion to form the valve head portion semifinished product, in which the valve head portion semifinished product has a cylindrical barrel section and a diameter-increased section at one end of the barrel section, the diameter-increased section being integral with the barrel section, when the diameter-increased section is located below, the maximum outer diameter of the diameter-increased section is equal to the maximum outer diameter of the diameter-increased section of the valve head portion as a finished product, and the valve head portion semifinished product has a cylindrical hollow hole having an inner diameter equal to the maximum inner diameter of the valve head portion hollow hole of the finished product, the cylindrical hollow hole opening at an upper end, and having a lower end bottomed in the diameter-increased section. Thus, the maximum inner diameter of the valve head portion hollow hole provided in the valve head portion as the finished product can be rendered larger than the outer diameter of the hollow shaft portion. Hence, sodium enclosed in the hollow hole can be filled within the hollow hole increased in diameter in the diameter-increased section of the valve head portion exposed to the highest temperature. As a result, cooling of the diameter-increased section of the valve head portion can be performed efficiently. Furthermore, sealing of the diameter-increased section of the valve head portion with a highly heat resistant material by welding is not performed. Instead, the highly heat resistant material packing the hollow hole of the diameter-increased section of the valve head portion is all subjected to forming integrally. Thus, no labor is required for welding, and no concern about strength is caused.

That is, the semifinished product of the valve head portion is first manufactured which is provided with the hollow hole of the same inner diameter as the maximum inner diameter of the valve head portion hollow hole provided in the valve head portion as the finished product. Afterwards, in the process for necking, with the bottomed end of the valve head portion hollow hole being intact, other parts thereof are narrowed, whereby a hollow hole of a desired inner diameter can be provided in the diameter-increased section of the valve head portion.

Moreover, the maximum outer diameter of the diameter-increased section of the semifinished product of the valve head portion has beforehand been brought into agreement with the outer diameter of the largest diameter-increased section of the valve head portion as the finished product. Thus, even in the subsequent narrowing (necking) process (second step), no force needs to be exerted on this site, that is, this site need not be pressed by the die. Consequently, no buckling or cracking occurs in the second step. That is, in order that neither the exterior nor the interior of the diameter-increased section, particularly, its middle to lower part, needs to be mostly worked in the second step, a shift toward the second step takes place after production of the semifinished product in which the maximum outer diameter of the diameter-increased section and the maximum inner diameter of the hollow hole within the diameter-increased section are equalized with the maximum outer diameter of the diameter-increased section of the valve head portion as the finished product and the maximum inner diameter of the hollow hole within the diameter-increased section of the valve head portion as the finished product, respectively. The cold forging process of the second step, therefore, is reduced to a very simple step in which the other parts, namely, the upper part of the diameter-increased section and the barrel section, are gradually necked down. This makes possible the cold forging of a particularly highly heat resistant steel material which has so far been considered difficult.

According to the conventional concept, "cold forging of the valve head portion" has been considered to be one for forming the whole of the valve head portion at a stroke by cold forging. On this occasion, difficulty in working the material has become a bottleneck, making such cold forging unachievable, as stated previously. However, the inventor of the present invention anticipated as follows: It would suffice to form, initially, the maximum outer diameter part of the diameter-increased section of the valve head portion and the maximum inner diameter part of the hollow hole inside it into the same shapes as those in the finished product. A subsequent step would be only to narrow (neck down) other parts a plurality of times. This method would enable cold forging to perform forming of the valve head portion. With this anticipation, the inventor conducted experiments. That is, the inventor thought of dividing the entire forming process for the valve head portion into the first step of forming the semifinished product in which the maximum outer diameter of the diameter-increased section and the maximum inner diameter of the hollow hole inside it are in the same state as the state of the finished product; and the second step of necking down other parts a plurality of times to obtain the finished product. Experiments on this dividing method led to a success in obtaining a complete valve head portion finished product by cold forging, without buckling or cracking.

According to the invention as Solution 1 or Solution 2, the method of the present invention similarly has the second step of gradually necking down an upper part of the diameter-increased section and a barrel section of the valve head portion semifinished product by cold forging in a plurality of stages, that is, gradually necking down the upper part of the diameter-increased section and the barrel section of the valve head portion semifinished product by use of dies for pressing the upper part of the diameter-increased section and the barrel section, the inner diameters of the dies being decreased little by little as the stage advances, the number of the dies used being equal to the number of necking processes, thereby obtaining the valve head portion as the finished product configured such that the maximum inner diameter of the valve head portion hollow hole in the diameter-increased section is maintained at the inner diameter of the cylindrical hollow hole, the inner diameter of the valve head portion hollow hole being decreased with increasing height and being equal to the inner diameter of a hollow hole of the hollow shaft portion at the upper end of the barrel section. Thus, it has become possible to carry out cold forging of the valve head portion using a particularly highly heat resistant material whose forming by conventional cold forging has been considered impossible.

That is, as mentioned earlier, no force is exerted on (the die is not applied to) the middle to lower part of the diameter-increased section (maximum outer diameter part and the surrounding part) of the valve head portion semifinished product. Instead, the parts upward thereof are necked down meticulously, little by little, a plurality of times. This has resulted in a success in the forming, by cold forging, of the valve head portion from a highly heat resistant material which has so far been regarded as impossible to perform.

The number of the necking processes differs according to the size or shape of the hollow engine valve. Provided that the number of the necking processes is N (N is a positive integer, and N□2), a number of the order of 8 to 15 is considered to be the appropriate number of the processes for the hollow engine valve in which the diameter of the hollow shaft portion is of the order of 6 mm, the inner diameter of the hollow hole in the hollow shaft portion is of the order of 3 mm, the outer diameter of the diameter-increased section of the valve head portion is of the order of 30 mm, and the maximum inner diameter of the hollow hole in the diameter-increased section of the valve head portion is of the order of 10 mm (the standard size of a hollow engine valve for use in the engine of an ordinary-sized passenger car). With the valve head portion of the hollow engine value of this size, if the number of the necking processes is less than 8, each necking process imposes an unbearable burden, causing buckling or cracking, or causing failure in the smooth performance of the necking process. It is not that the larger the number of the processes, the better results are obtained. As the number of the processes increases, preparations have to be made for more of the dies, the scale of equipment becomes greater, working is laborious, and the working time lengthens. For 15 or more of the processes, the finishing accuracy and the smoothness of the process are not very different. Thus, the upper limit is considered to be a number of the order of 15.

As discussed above, no force is exerted on the middle to lower part of the diameter-increased section (maximum outer diameter part and the surrounding part) of the valve head portion, and the number of the necking processes is set at a number in the appropriate range, whereby success is achieved in the forming, by cold forging, of the valve head portion from the particularly highly heat resistant material. As a result, devices or apparatuses necessary for hot forging have become unnecessary, and the production line has been downscaled and simplified successfully. Moreover, time for heating the members, and time for cooling them can be eliminated, thus shortening the manufacturing time and contributing to cost reduction. Furthermore, cold forging is highly accurate compared with hot forging, so that the remarkable effect of achieving an improvement in the quality of the product could be exhibited.

According to the invention of Solution 1 or Solution 2 as the present invention, the first step for obtaining the valve head portion semifinished product is described in detail. Thus, the present invention can be practiced concretely. That is, the invention of Solution 1 or Solution 2 uses as the material a cylindrical solid round bar comprising a material having heat resistance comparable to or better than the heat resistance of the material for the hollow shaft portion, the solid round bar having a diameter larger than the minimum outer diameter of the valve head portion as the finished product, but smaller than the maximum outer diameter of the valve head portion as the finished product. Such a material can be obtained easily by forming a round bar to a predetermined diameter, followed by cutting. Forming of the hollow hole can be performed easily by punching or forging (hot, warm or cold), and forming of the diameter-increased section can be performed easily by forging (hot, warm or cold). It goes without saying that working is more difficult by cold forging than by hot forging, but cold forging is sufficiently available, because it suffices to obtain the semifinished product of by far a simpler shape than the valve head portion finished product.

With the present invention, therefore, in the relatively technically easy first step, namely, in the step of obtaining the semifinished product of the valve head portion, the following two elements are preformed:
1. the hollow hole having the inner diameter equal to the maximum inner diameter of the hollow hole of the valve head portion as the finished product, and
2. the diameter-increased section having the outer diameter equal to the maximum outer diameter of the diameter-increased section of the valve head portion as the finished product.

In the second step involving cold forging, which has technically complicated factors, the above sites 1 and 2 are kept out of touch, energy is concentrated on a very simple "narrowing" (or necking) process, and this process is repeated a required number of times to proceed with necking gradually.

The above measures have brought success in the cold forging of the valve head portion from an excellently heat resistant material which has thus far been regarded as an impossible procedure.

To these facts do the essential points of the present invention boil down.

That is, as discussed earlier, the conventional procedure has not escaped from the idea of forming the valve head portion from the particularly highly heat resistant material by working at a stroke. Thus, such forming has been considered impossible with cold forging. Consequently, various advantages of cold forging have been fully recognized, but even a person who attempts the forming has not appeared.

On the other hand, the inventor of the present invention has many years' experience in the development of forging technologies, particularly, in the field of cold forging, as stated earlier. From this experience, the inventor has hit on the idea that the cold forging of the valve head portion from the particularly highly heat resistant material cannot be performed at a stroke, but may be achievable if it is divided into the aforementioned first step and second step. Practice based on this idea has led to success in the forming of the valve head portion with high working accuracy by cold forging, without defects such as buckles or cracks. As noted here, various effects possessed by cold forging have been obtainable in the forming of the valve head portion by working the material with particularly satisfactory heat resistance.

According to the invention of Solution 3 or Solution 4 as the present invention, the respective processes of the second step in the invention of Solution 1 or Solution 2 are described in detail. Thus, the second step with these inventive aspects can be carried out concretely. Moreover, there is a disclosure that a plurality of the valve head portion semifinished products are transfer-moved, so that the second step can be constructed rationally, with waste being avoided. That is, the cold forging step as the second step can be performed, with minimal time required for working and minimal scale of working equipment. Furthermore, according to the invention of Solution 5 or Solution 6 as the present invention, there can be obtained a hollow engine valve as a finished product having the valve head portion obtained by the invention of Solution 1 or Solution 2 or Solution 3 or Solution 4 as the present invention.

BRIEF DESCRIPTION OF THE DRAWINGS

FIG. 6 is graphs showing the main components of various materials for use in a valve head portion, a hollow shaft portion, and a shaft end sealing material in Embodiment 1 of the present invention.

MODE FOR CARRYING OUT THE INVENTION

Modes for carrying out the present invention will be described in detail below by reference to the accompanying drawings.

Embodiment 1

Figure 5:
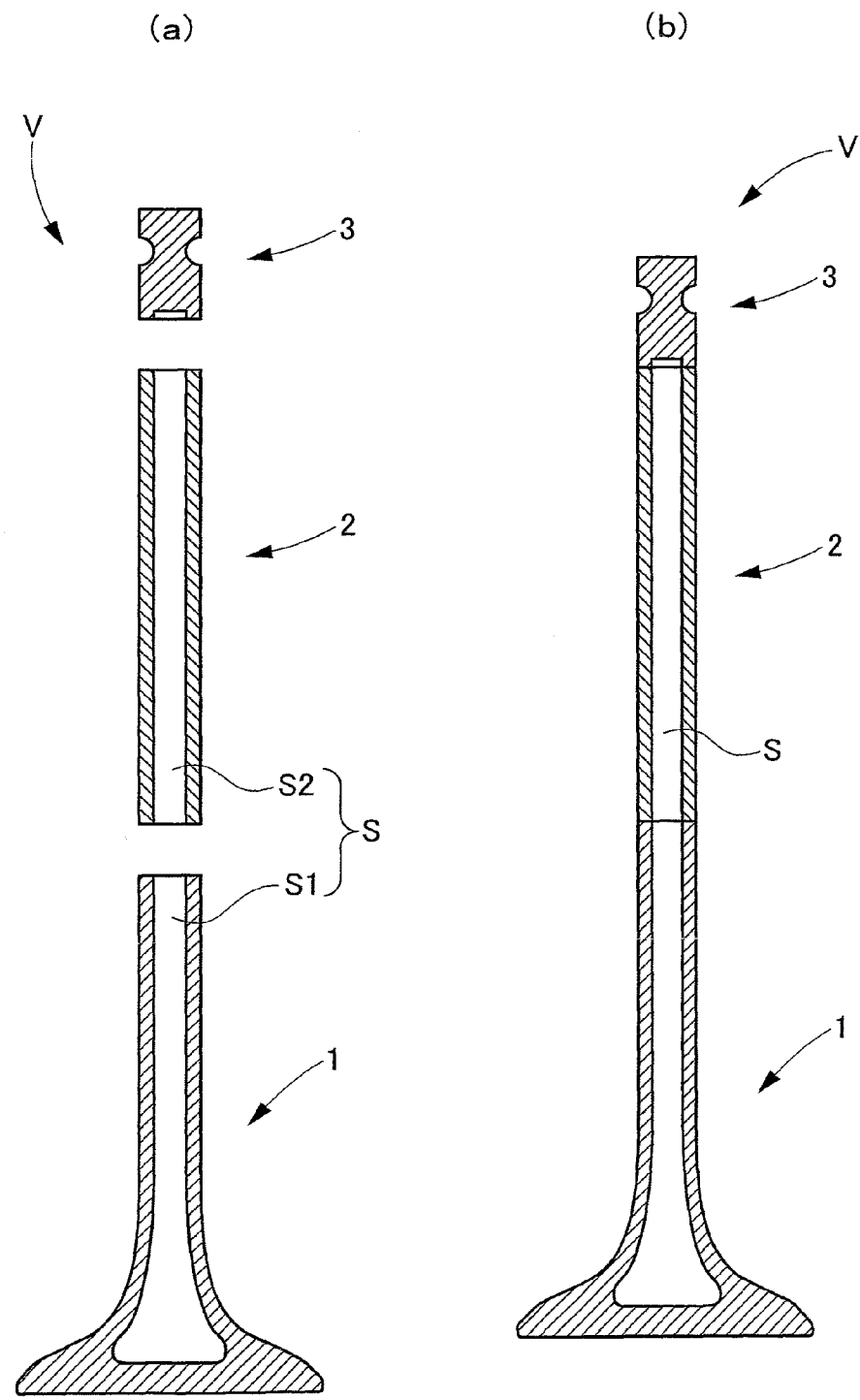
FIG. 5(a) is an explanation drawing for explaining the configuration of a hollow engine valve in Embodiment 1 of the present invention.
FIG. 5(b) is an explanation drawing for explaining the configuration of the hollow engine valve in Embodiment 1 of the present invention.

As Embodiment 1 of the present invention, a method for production of a valve head portion 1, and a hollow engine valve V having the valve head portion 1 will be described in detail below. The hollow engine valve V is composed of the valve head portion 1, a hollow shaft portion 2, and a shaft end sealing material 3, as shown in FIG. 5a and FIG. 5b. That is, the hollow engine valve V is in a configuration in which the valve head portion 1 is welded to one end of the hollow shaft portion 2, the shaft end sealing material 3 is welded to the other end of the hollow shaft portion 2, and a hollow hole S is provided inside. Sodium (not shown) is enclosed in the hollow hole S. The sodium is enclosed therein before the shaft end sealing material 3 is welded. As the hollow shaft portion 2, there can be used an electric resistance welded pipe formed by rolling up a sheet plate and welding its ends together, or a seamless pipe without seams. There is no limitation on a welding method for welding the valve head portion 1 or the shaft end sealing material 3 to the hollow shaft portion 2, and friction welding, for example, can be used. S1 denotes a hollow hole within the valve head portion 1, and S2 denotes a hollow hole within the hollow shaft portion. When the hollow engine valve V is used for an intake valve, there is no need to enclose sodium within the hollow hole S, and the hollow hole S may remain hollow.

In connection with the materials for the valve head portion 1, the hollow shaft portion 2, and the shaft end sealing material 3, they are arranged based on heat resistance as follows:

Materials having particularly high resistance to heat (material group A) . . . . Used for the valve head portion 1.

Materials having the next highest resistance to heat (material group B) . . . . Used for the hollow shaft portion 2.

Materials having ordinary resistance to heat (material group C) . . . . Used for the shaft end sealing material 3.

However, the above arrangement is predicated on the use of the hollow engine valve V for an exhaust valve. If the hollow engine valve V is used for an intake valve, there is no harm in constituting all of the valve head portion 1, the hollow shaft portion 2, and the shaft end sealing material 3 from the above material group C (materials having ordinary heat resistance).

An example of the above material group A will be named concretely below. For the main components of each material, reference is requested to FIG. 6.

NCF47W (nickel-based steel)

SUH35 (austenitic manganese-based steel)

Inconel 751 (nickel-based steel)

"Inconel" is a registered trademark of Special Metals Corporation (formerly, International Nickel Company), and the Inconel products are available in various kinds depending on the proportions of elements, such as chromium, niobium and molybdenum, added to nickel as the base. All these products have particularly good heat resistance, but their working is difficult.

Next, an example of the above material group B will be named concretely below. For the main components of each material, reference is requested to FIG. 6.

SUS304 (austenitic nickel-based steel)
SUS430 (ferritic stainless steel)
SUH11 (martensitic stainless steel)

SUS304 is a representative stainless steel sometimes called 18-8. It is excellent in workability, corrosion resistance, and heat resistance, but hardens greatly upon working, and is thus considered to be slightly unsuitable for cold forging. SUS430 is a representative steel among chromium stainless steels called 18Cr. It is less expensive than the 18-8 products, but is slightly inferior in workability and corrosion resistance. For SUH11, reference is requested to the following paragraph.

Finally, an example of the above material group C will be named concretely below. For the main components, reference is requested to FIG. 6.

SUH11 (martensitic stainless steel)

SUH11 is a martensitic heat resistant steel, and is chromium-based. Its heat resistance is inferior to that of SUS304 and SUS430, but its workability is satisfactory. Since this material has a certain degree of heat resistance, it can be used for the hollow shaft portion 2, as mentioned above.

The materials for the valve head portion 1, the hollow shaft portion 2, and the shaft end sealing material 3 are as described above. When the hollow engine valve V is used for an exhaust valve, the material for the valve head portion 1 is selected from the material group A, the material for the hollow shaft portion 2 is selected from the material group B, and the material for the shaft end sealing material 3 is selected from the material group C. Needless to say, however, it poses no problem even if the material for the hollow shaft portion 2 is selected from the material group A, and the material for the shaft end sealing material 3 is selected from the material groups A and B. When the hollow engine valve V is used for an intake valve, the materials for the valve head portion 1, the hollow shaft portion 2, and the shaft end scaling material 3 can all be selected from the material group B or group C. Even if these materials are selected from the group A, there would, of course, be technically no problem, but this selection is meaningless from the aspect of working or price.

The formation of the valve head portion, as the core of Embodiment 1 of the present invention, will be describe in detail below.

<First Step>

Figure 1:
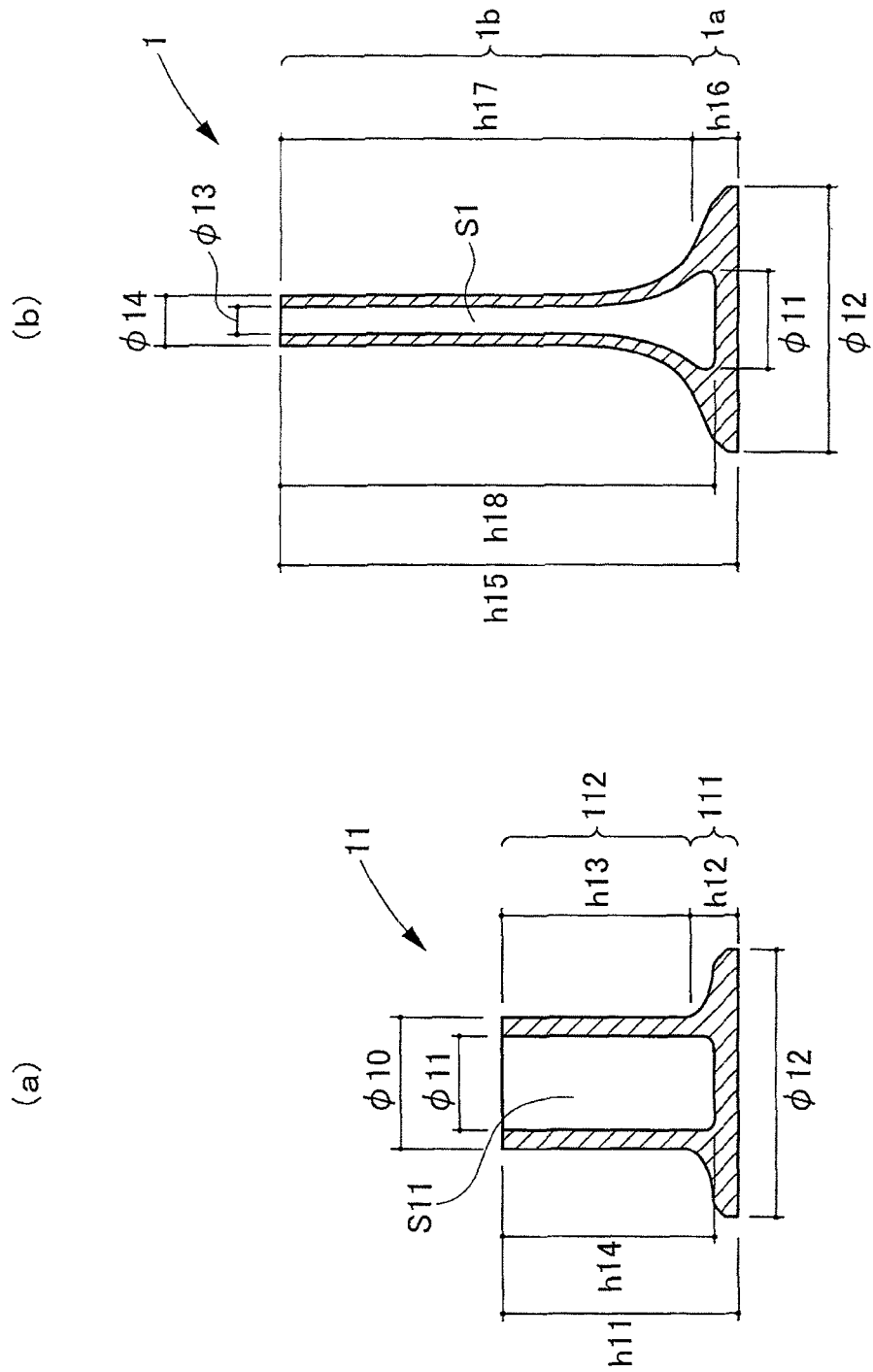
FIG. 1(a) is an explanation drawing for explaining a first step in a manufacturing method in Embodiment 1 of the present invention.
FIG. 1(b) is an explanation drawing for explaining the first step in the manufacturing method in Embodiment 1 of the present invention.

FIGS. 1a, 1b show the first step of Embodiment 1 of the present invention. FIG. 1a shows a semifinished product 11 of the valve head portion 1 in a longitudinal sectional view. The semifinished product 11 has a disk-shaped diameter-increased section 111 and a cylindrical barrel section 112 formed integrally. The lower end of the barrel section 112 is continuously connected to the upper end of the diameter-increased section 111, and the junction between them is in gentle curves, as shown in FIG. 1a. A hollow hole S11 of a cylindrical shape having a bottomed lower end is formed inside the semifinished product 11, and the upper end of the hollow hole S11 opens at the upper surface of the barrel section 112, while the lower end of the hollow hole S11 is bottomed in the diameter-increased section 111. An upper part of the diameter-increased section 111 and the whole of the barrel section 112 of the semifinished product 11 are narrowed (necked) by cold forging to obtain a finished product of the valve head portion 1 as shown in FIG. 1b. In FIG. 1b, 1a denotes a diameter-increased section, and 1b denotes a barrel section. In the valve head portion 1 as the finished product, it is difficult to determine the boundary between the diameter-increased section 1a and the barrel section 1b. In FIG. 1b, however, the diameter-increased section 1a and the barrel section 1b are separated at the site where the curvature of the curve of the contour of the sectional view sharply increases. S1 denotes a hollow hole of a cylindrical shape having a bottomed lower end, and the upper end of the hollow hole S1 opens at the upper surface of the barrel section 1b, while the lower end of the hollow hole S1 is bottomed inside the diameter-increased section 1a.

In FIG. 1a, h11 denotes the entire height of the semifinished product 11, h12 denotes the height of the diameter-increased section 111, h13 denotes the height of the barrel section 112, h14 denotes the height (depth) of the hollow hole S11, $\phi$10 denotes the outer diameter of the barrel section 112, $\phi$12 denotes the maximum outer diameter of the diameter-increased section 111, and $\phi$1 denotes the inner diameter of the hollow hole S1. In FIG. 1b, h15 denotes the entire height of the valve head portion 1 as the finished product, h16 denotes the height of the diameter-increased section 1a, h17 denotes the height of the barrel section 1b, h18 denotes the height (depth) of the hollow hole S1, $\phi$14 denotes the outer diameter of the upper end part of the barrel section 1b, $\phi$12 denotes the maximum outer diameter of the diameter-increased section 111, $\phi$11 denotes the maximum inner diameter of the hollow hole S1, and $\phi$13 denotes the inner diameter of the upper end part of the hollow hole S1.

Here, the entire height h15 of the valve head portion 1 as the finished product is larger than the entire height h11 of the semifinished product 11 (h11<h15); the height (depth) h18 of the hollow hole S1 is larger than the height (depth) h14 of the hollow hole S11 (h14<h18); the height h12 of the diameter-increased section 111 is nearly equal to the height h16 of the diameter-increased section 1a (h12≈h16); the height h17 of the barrel section 1b is larger than the height h13 of the barrel section 112 (h13<h17); the maximum outer diameter of the diameter-increased section 111 is equal to the maximum outer diameter of the diameter-increased section 1a ($\phi$12); the outer diameter $\phi$10 of the upper end part of the barrel section 112 is larger than the outer diameter $\phi$14 of the upper end part of the barrel section 1b ($\phi$14<$\phi$10); the inner diameter of the hollow hole S11 is equal to the maximum inner diameter of the hollow hole S1 ($\phi$11); and the inner diameter $\phi$11 of the hollow hole S11 is larger than the inner diameter $\phi$13 of the upper end part of the hollow hole S1 ($\phi$134<$\phi$11).

Figure 2:
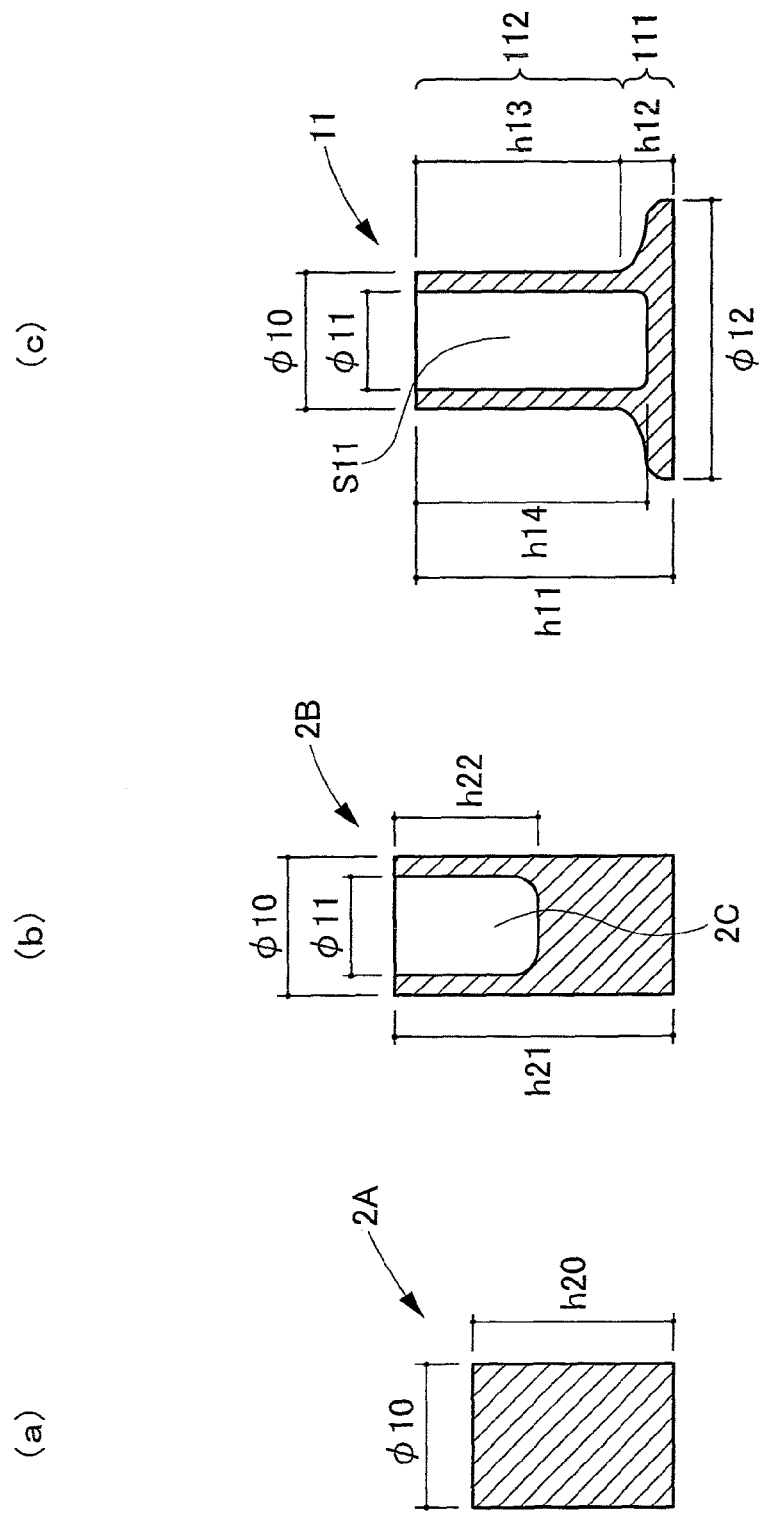
FIG. 2(a) is an explanation drawing for explaining a first method of the first step in the manufacturing method in Embodiment 1 of the present invention.
FIG. 2(b) is an explanation drawing for explaining the first method of the first step in the manufacturing method in Embodiment 1 of the present invention.
FIG. 2(c) is an explanation drawing for explaining the first method of the first step in the manufacturing method in Embodiment 1 of the present invention.

FIGS. 2a to 2c show the first method for obtaining the semifinished product 11. As shown in FIG. 2a, preparations are made for a solid round bar 2A comprising a material selected from the material group A (see FIG. 6). In Embodiment 1, NCF47W was used (for the main components, see FIG. 6). The outer diameter of the solid round bar 2A is $\phi$10, the same as the outer diameter of the barrel section 112 of the semifinished product 11, and the height h20 of the solid round bar 2A is smaller than the height h11 of the semifinished product 11 (h20<h11).

A hollow hole 2C is formed in the upper surface of the solid round bar 2A by means of a punch to obtain a cup-shaped intermediate member 2B (FIG. 2b). The hollow hole 2C has a height (depth) h22 which is nearly a half of the entire height h21 of the intermediate member 2B. On this occasion, the outer diameter of the intermediate member 2B is rendered the same as the outer diameter $\phi$10 of the solid round bar 2A, with the result that the height h21 of the intermediate member 2B is larger than the height h20 of the solid round bar 2A (h20<h21). The inner diameter of the hollow hole 2C is equal to the inner diameter $\phi$11 of the hollow hole S11 of the semifinished product 11 (FIG. 2c).

Then, a lower part of the intermediate member 2B is shaped by forging to form a diameter-increased section 111. On this occasion, the type of forging does not matter. That is, any of cold forging, warm forging, and hot forging may be used. Since this step is an intermediate step, accuracy as required in the second step to be described later is not demanded. However, the following three points are of importance: the outer diameter of the upper part of the intermediate member 2B is maintained at the outer diameter $\phi10$ of the barrel section of the semifinished product 11; the inner diameter of the hollow hole 2C is maintained at the inner diameter $\phi11$ of the hollow hole S11 of the semifinished product 11; and when the lower part of the intermediate member 2B is converted into the diameter-increased section 111, its maximum outer diameter is rendered the maximum outer diameter $\phi12$ of the diameter-increased section 111 of the semifinished product 11. During this process, the hollow hole 2C (height h22) is slightly deepened to form the hollow hole S11 having a height (depth) h14. In this manner, the semifinished product 11 (FIG. 2c) is obtained from the solid round bar 2A (FIG. 2a) via the intermediate member 2B (FIG. 2b).

Figure 3:
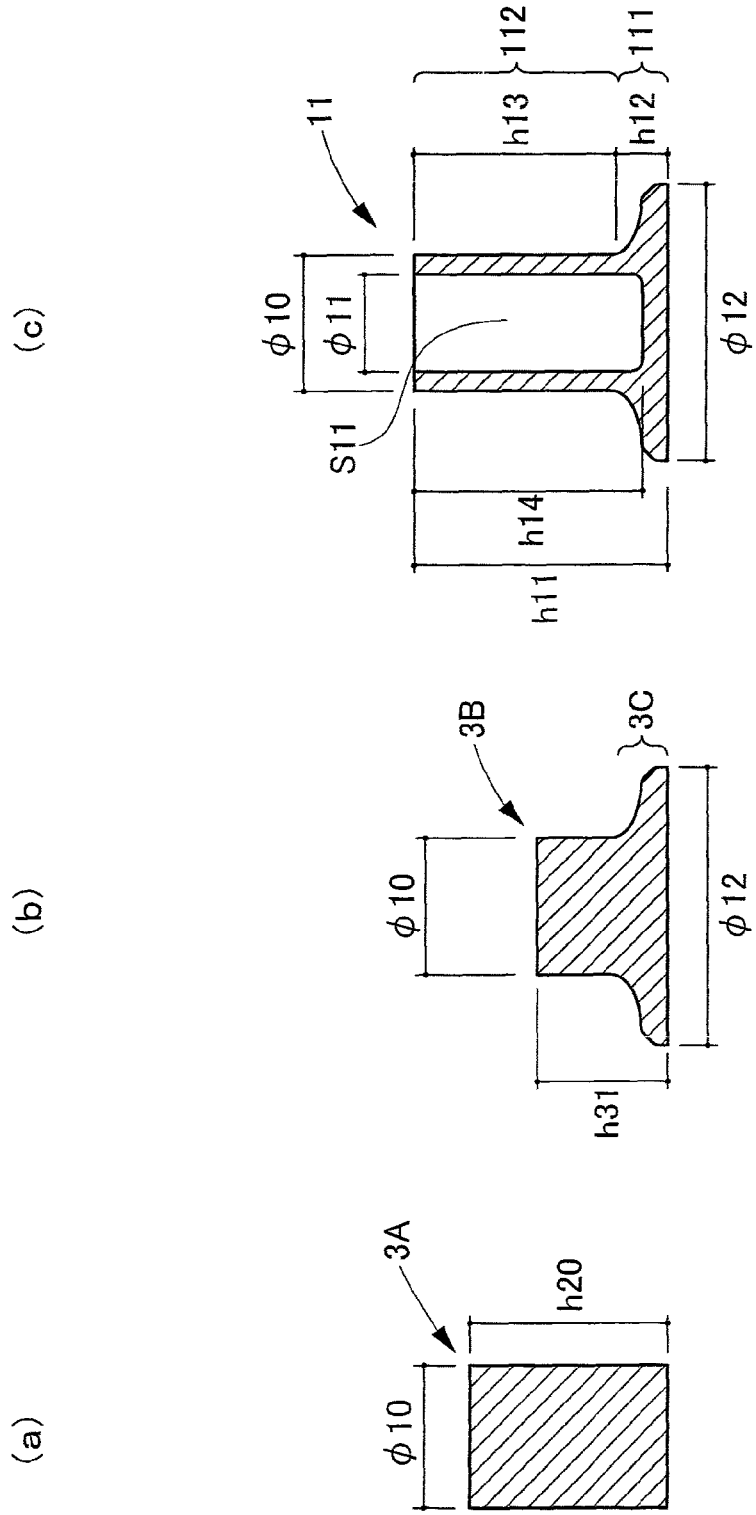
FIG. 3(a) is an explanation drawing for explaining a second method of the first step in the manufacturing method in Embodiment 1 of the present invention.
FIG. 3(b) is an explanation drawing for explaining the second method of the first step in the manufacturing method in Embodiment 1 of the present invention.
FIG. 3(c) is an explanation drawing for explaining the second method of the first step in the manufacturing method in Embodiment 1 of the present invention.

FIGS. 3a to 3c show the second method for obtaining the semifinished product 11. As shown in FIG. 3a, preparations are made for a solid round bar 3A comprising a material selected from the material group A (see FIG. 6). In Embodiment 1, NCF47W was used. The outer diameter of the solid round bar 3A is $\phi10$, the same as the outer diameter of the barrel section 112 of the semifinished product 11, and the height h30 of the solid round bar 3A is smaller than the height h11 of the semifinished product 11 (h30<h11). The height h30 is equal to the height h20 of the aforementioned solid round bar 2A (h30=h20).

A lower part of the solid round bar 3A is shaped by forging to form a hat-shaped solid intermediate member 3B having a diameter-increased section 3C (FIG. 3b). On this occasion, the type of forging does not matter. That is, any of cold forging, warm forging, and hot forging may be used. Since this step is an intermediate step, accuracy as required in the second step to be described later is not demanded. However, the following two points are of importance: the outer diameter of the upper part of the intermediate member 3B is maintained at the outer diameter $\phi10$ of the barrel section of the semifinished product 11; and when the lower part of the intermediate member 3B is converted into the diameter-increased section 3C, the maximum outer diameter of the diameter-increased section 3C is rendered the maximum outer diameter $\phi12$ of the diameter-increased section 111 of the semifinished product 11. During this process, the height h31 of the intermediate member 3B is slightly decreased. That is, h31<h30.

Then, a hollow hole S11 having a height (depth) h14 and an inner diameter of $\phi11$ is formed in an upper surface of the intermediate member 3B by means of a punch. During this process, an upper part of the intermediate member 3B is extended to form a barrel section 112 with a height of h13 (FIG. 3c). In this manner, the semifinished product 11 (FIG. 3c) is obtained from the solid round bar 3A (FIG. 3a) via the intermediate member 3B (FIG. 3b). On this occasion, the following two points are of importance: the outer diameter of the barrel section 112 is maintained at $\phi10$; and the maximum outer diameter of the diameter-increased section 111 is maintained at $\phi12$.

<Second Step>

Figure 4:
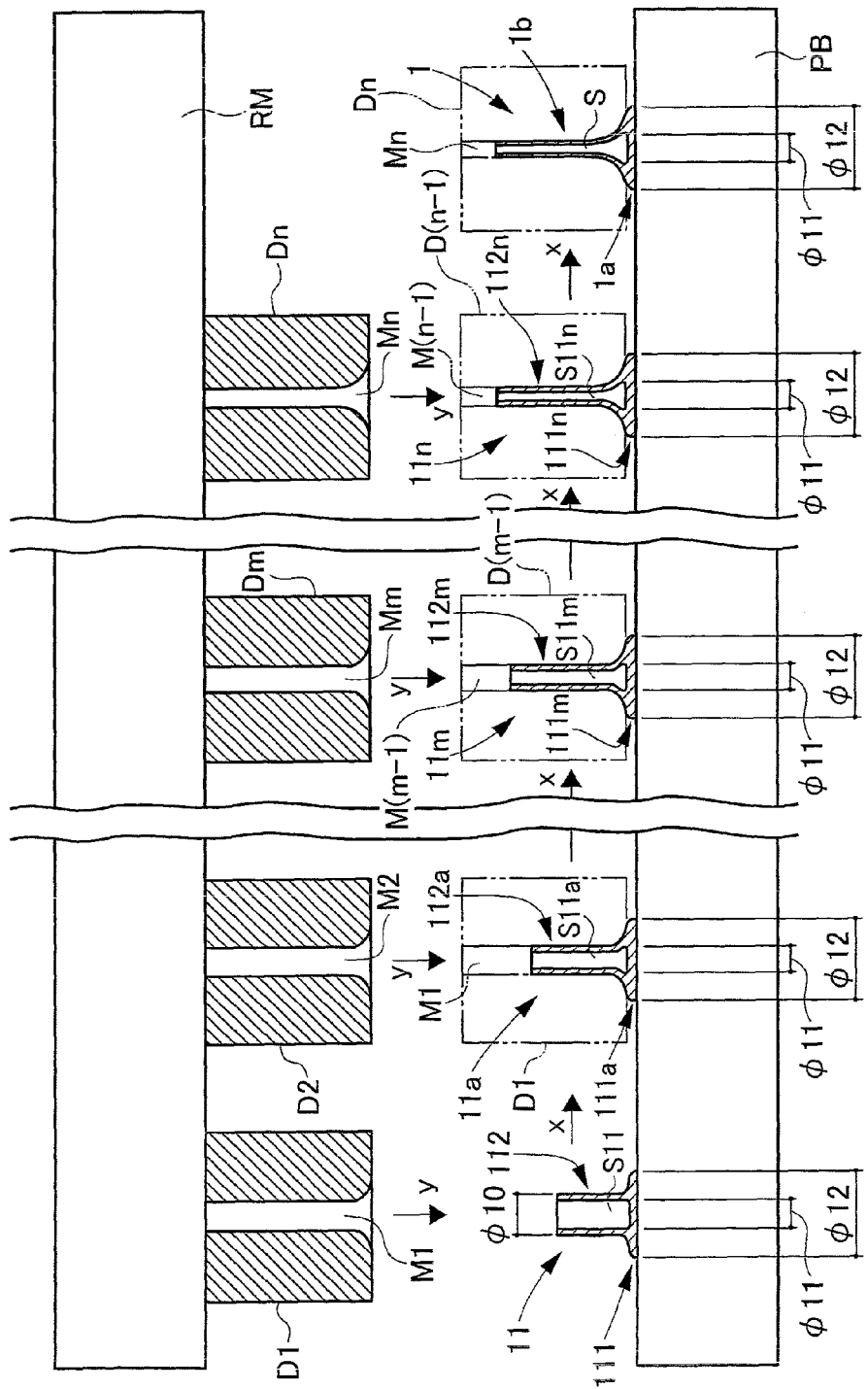
FIG. 4 is an explanation drawing for explaining a second step in the manufacturing method in Embodiment 1 of the present invention.

Next, FIG. 4 illustrates details of the process for cold forging in the second step. In FIG. 4, D1, D2, D(m−1), Dm, D(n−1), and Dn denote dies. Here, Dn represents the n-th (last) die, Dm represents the m-th die, m<n, and m and n each denote a positive integer of 3 or larger. D(m−1) represents the die directly before the die Dm, and D(n−1) represents the die directly before the die Dn. The dies D1, D2, D(m−1), Dm, D(n−1), and Dn have central forming holes M1, M2, M(m−1), Mm, M(n−1), and Mn whose inner diameters decrease sequentially. RM represents a ram to which the dies D1, D2, D(m−1), Dm, D(n−1), and Dn are fixed.

The numeral 11 denotes a semifinished product, the numerals 11a, 11m and 11n denote intermediate works, and the numeral 1 denotes a valve head portion as a finished product. Moreover, PB represents a press bed where the semifinished product 11, the intermediate works 11a, 11m and 11n, and the finished product of the valve head portion 1 are fixed. To achieve the appropriate state of fixing of the dies D1, D2, D(m−1), Dm, D(n−1), and Dn to the ram RM, and the appropriate state of fixing of the semifinished product 11, the intermediate works 11a, 11m and 11n, and the finished product of the valve head portion 1 to the press bed PB, various fixtures are needed without doubt. However, their indication will make the accompanying drawings complicated and difficult to understand. Thus, illustrations of the various fixtures and so on are all omitted. Furthermore, apparatuses concerned with transfer movement (to be described later) for use in this step are all omitted from the illustrations herein.

Next, the actions of the second step will be described. In FIG. 4, the die D1 is located above the semifinished product 11, the die D2 is located above the intermediate work 11a, the die Dm is located above the intermediate work 11m, and the die Dn is located above the intermediate work 11n. In the initial state, it is only natural that the semifinished product 11 is located below the die D1, and none of the intermediate works 11a, 11m, 11n and the finished product of the valve head portion 1 are present. In this state, the ram RM is lowered (in the y direction).

Once the ram RM lowers, the forming hole M1 of the die D1 necks down the upper part of the diameter-increased section 111 and the barrel section 112 in the semifinished product 11 to form the semifinished product 11 into the intermediate work 11a. The inner diameter of the forming hole M1 is slightly smaller than the outer diameter $\phi10$ of the barrel section 112 of the semifinished product 11. Thus, the outer diameter $\phi10$ of the barrel section 112 of the semifinished product 11 is slightly decreased to obtain the intermediate work 11a, whose height is somewhat larger than the height h11 of the semifinished product 11 (see FIG. 1a). The hollow hole S11 of the semifinished product 11 is also narrowed to become the hollow hole S11a of the intermediate work 11a whose inner diameter $\phi11$ has been slightly decreased. However, the die D1 does not press the region from the middle part to the lower part of the diameter-increased section 111 (the part with the maximum outer diameter and the surrounding part) of the semifinished product 11. Thus, the lower end part of the hollow hole S11 is not pressed, and the inner diameter at this site is maintained at $\phi11$. Hence, needless to say, the maximum outer diameter of the diameter-increased section 111a of the intermediate work 11a is also maintained at $\phi12$.

Upon completion of the first necking, the ram RM is raised, and the semifinished product 11 has turned into the intermediate work 11a. On this occasion, by the action of the fixture (not shown), the intermediate work 11a is fixed to the press bed PB, and thus does not ascend together with the die D1. When the ascent of the ram RM ends, the intermediate work 11a (formerly, the semifinished product 11) is released from fixing, and transfer-moved (in the x direction) rightward to the next position in FIG. 5 by a moving device (not shown), whereafter it is located directly below the next die D2 and fixed again. The transfer movement refers to such a movement as to displace the work sequentially, by one position at a time. When the intermediate work 11a (former semifinished product 11) is transfer-moved rightward, a new semifinished product 11 is fixed to the vacant position.

At this stage, therefore, the semifinished product 11 and the intermediate work 11a are fixed onto the press bed PB. In this state, the ram RM is lowered (in the y direction) to press-form the semifinished product 11 by the die D1 and the intermediate work 11a by the die D2. Upon completion of the press forming, the semifinished product 11 and the intermediate work 11a are transfer-moved rightward, and a new semifinished product 11 is fixed to the left end of the press bed PB.

The m-th intermediate work 11m and the m-th die Dm are shown in the center of FIG. 4. Rightwardly of them, the last intermediate work 11n and the last die Dn are shown. The last intermediate work 11n is press-formed by the die Dn, whereby it is converted into the valve head portion 1 as the finished product, and is then transfer-moved rightward. The transfer-moved valve head portion 1 as the finished product is shown at the right end of FIG. 4. The finished product, valve head portion 1, is removed from the press bed PB.

In the foregoing manner, each time the ram RM is lowered (in the y direction), the semifinished product 11, and the intermediate works 11a, 11m, 11n are transfer-moved rightward (in the x direction). Also, the valve head portion 1 as the finished product is removed from the press bed PB, and a new semifinished product 11 is fixed to the left end of the press bed PB. In this manner, forming by cold forging is carried out continuously, whereby each descent of the ram RM results in the production of one valve head portion 1 as the finished product. Thus, this procedure is very rational and efficient. Generally, the number of the forming processes being large is pointed out as a drawback of cold forging, but this drawback is dissolved by adopting the above-described transfer movement.

As shown in FIG. 4, the dies D1, D2, Dm and Dn all press-form the upper parts of the diameter-increased sections 111, 111a, 111m, 111n and barrel sections 112, 112a, 112m, 112n of the semifinished product 11 and the intermediate works 11a, 11n, 11n, and do not touch the center to the lower part of the diameter-increased sections 111, 111a, 111m, 111n (the part of the maximum outer diameter and the surrounding part). Thus, the maximum outer diameter of the diameter-increased sections 111, 111a, 111m, 111n is maintained unchanged at $\phi$12, which becomes the maximum outer diameter $\phi$12 of the diameter-increased section 1a of the valve head portion 1 as the finished product.

The parts other than the lower end parts of the hollow holes S11, S11a, S11m, S11n of the semifinished product 11 and the intermediate works 11a, 11m, 11n have inner diameters decreased as a result of press forming. On the other hand, the lower end parts of the hollow holes S11, S11a, S11m, S11n are not subjected to press forming, so that their maximum inner diameter is kept at $\phi$11, which leads to the maximum inner diameter $\phi$11 of the hollow hole of the valve head portion 1 as the finished product.

N, which is the number of the steps or processes in the second step, is basically a natural number of 2 or greater, but concretely, is different depending on the size or shape of the hollow engine valve demanded. Currently, for the hollow engine valve in which the diameter of the hollow shaft portion is of the order of 6 mm, the inner diameter of the hollow hole in the hollow shaft portion is of the order of 3 mm, the outer diameter of the diameter-increased section of the valve head portion is of the order of 30 mm, and the maximum inner diameter of the hollow hole in the diameter-increased section of the valve head portion is of the order of 10 mm (the standard size of a hollow engine valve for use as the engine of an ordinary-sized passenger car), the appropriate number of the processes is considered to be of the order of 8 to 15. The reason for this numerical restriction is as described earlier. In Embodiment 1, cold forging of the hollow engine valve of the above size was attempted in various numbers, and the optimum number of the processes was found to be in the neighborhood of 12.

In connection with transfer movement, there may be a method in which the intermediate work 11a (the former semifinished product 11) is merely transfer-moved rightward during the first transfer movement, and a new semifinished product 11 is not placed directly below the die D1. With this method, a new semifinished product 11 is placed directly below the die D1 at the time of the odd-numbered transfer movement, like the third transfer movement, the fifth transfer movement, and so on. By so doing, the works on the press bed PB are placed on every other position, with the result that the resistance during pressing is halved. Time for obtaining the same number of the products is twice that taken in ordinary transfer movement, but many advantages are brought, such as a labor saving for equipment and an increase in durability of the equipment because of a reduction in the pressure of the press.

In the above configuration, the works and the dies were both arranged linearly, but various applied forms are naturally conceivable, such as circumferential arrangement or zigzag arrangement. Moreover, the ram RM was placed above, and the press bed PB was placed below. However, the ram RM may be placed below, while the press bed PB may be placed above, and the ram RM may be raised at the time of forming.

The second step described above is performed by cold forging in Embodiment 1, but needless to say, can be carried out by warm forging. Cold forging refers normally to forging at the ordinary temperature, but as far as the temperature range is concerned, forging at a temperature of the order of 0° C. to 250° C. may be called cold forging. The range of the temperature for warm forging is normally regarded as 600° C. to 850° C. It follows that forging at 250° C. to 600° C. is cold forging if the temperature is lower, and warm forging if the temperature is higher. Forging at a temperature in excess of 850° C. is deemed to be hot forging.

The details of the second step have been described above. As a result of the second step, the forming of the valve head portion 1 is completed. Then, the three members shown in FIG. 5a, i.e., the valve head portion 1, the hollow shaft portion 2, and the shaft end sealing material 3, are all integrated as in FIG. 5b, that is, by securing the valve head portion 1 to one end of the hollow shaft portion 2, and the shaft end sealing material 3 to the other end of the hollow shaft portion 2, by welding. By so doing, the hollow engine valve V is completed. In Embodiment 1, friction welding was used as the welding method. When the hollow engine valve V is used for an exhaust valve, sodium is enclosed in the hollow hole S before the shaft end sealing material 3 is welded, although this not shown in FIG. 5b.

As shown in FIG. 5b, the position of welding between the valve head portion 1 and the hollow shaft portion 2 is a high position rather close to the middle of the hollow engine valve V. This is one of the merits of the method of the present invention which forms the valve head portion 1 by cold forging. When the weld line can be separated from the leading end of the valve head portion 1 this far, the weld line is always located outside the cylinder during engine operation. Thus, the influence of heat is so slight that the problem of concern over strength due to welding is completely resolved. Even if a material inferior in heat resistance to the material of the valve head portion 1 is used as the material for the hollow shaft portion 2, no problem arises.

Embodiment 2

Figure 7:
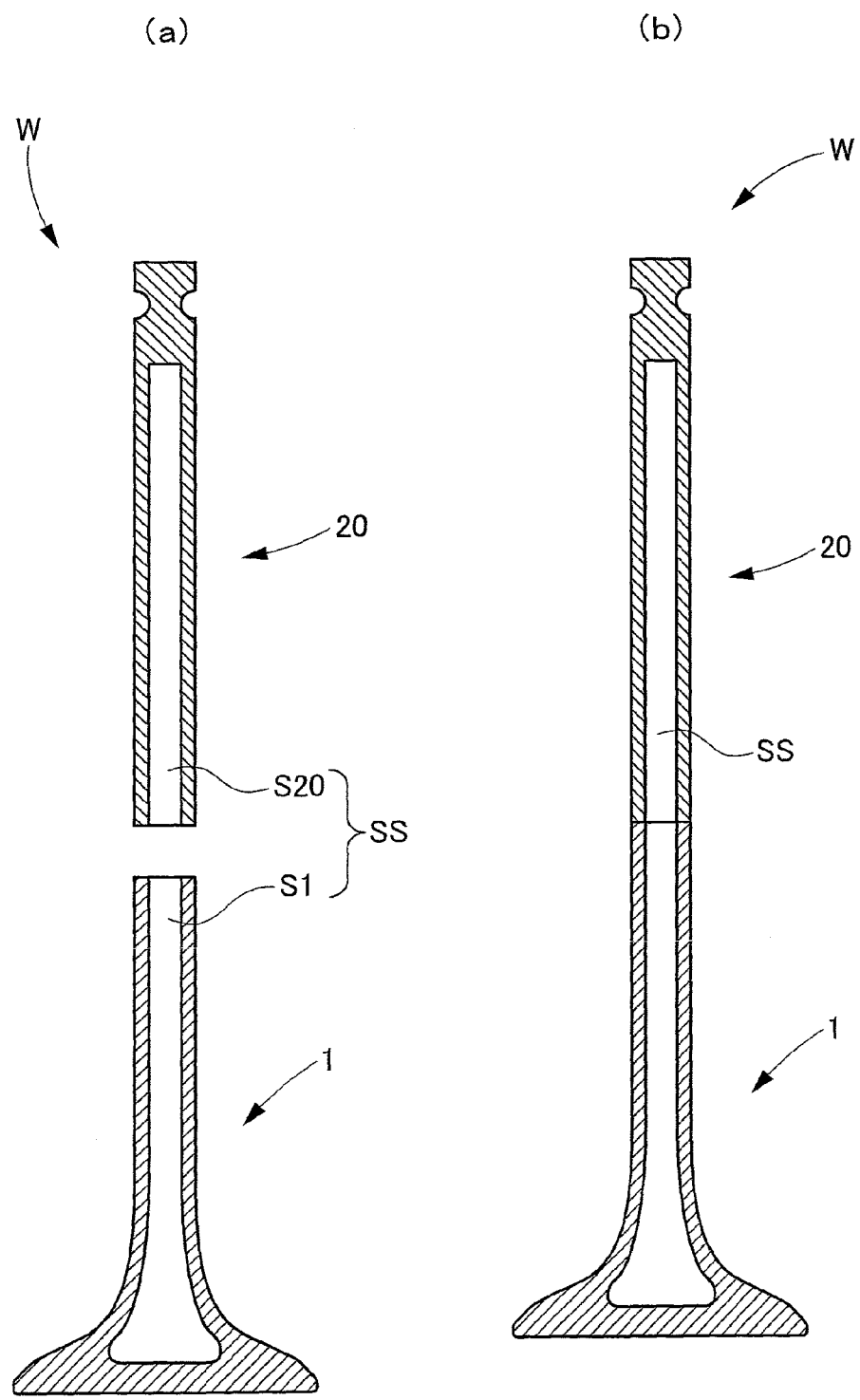
FIG. 7(a) is an explanation drawing for explaining the configuration of a hollow engine valve in Embodiment 2 of the present invention.
FIG. 7(b) is an explanation drawing for explaining the configuration of the hollow engine valve in Embodiment 2 of the present invention.

A hollow engine valve W in Embodiment 2 of the present invention is composed of a valve head portion 1 and a hollow shaft portion 20, as shown in FIG. 7a and FIG. 7b. That is, the hollow engine valve W is in a configuration in which the hollow shaft portion 20 is sealed at one end, the valve head portion 1 is welded to the other end of the hollow shaft portion 20, and a hollow hole SS is provided inside. Sodium (not shown) is enclosed in the hollow hole SS. The sodium is enclosed therein before the valve head portion 1 and the hollow shaft portion 20 are welded. As the hollow shaft portion 20, there can be used an electric resistance welded pipe formed by rolling up a sheet plate and welding its ends together, or a seamless pipe without seams and sealed at one end, or a solid round bar having a hollow hole S 20 bored by a drill. There is no limitation on a welding method for welding the valve head portion 1 to the hollow shaft portion 2, and friction welding, for example, can be used. When the hollow engine valve W is used for an intake valve, there is no need to enclose sodium within the hollow hole SS, and the hollow hole SS may remain hollow. The method of producing the valve head portion 1 is the same as in Embodiment 1 for both of the first step and the second step, and thus its detailed description is omitted.

As the material for the valve head portion 1 of Embodiment 2, the material group A mentioned in the paragraphs of Embodiment 1 can be used. As the material for the hollow shaft portion 20 of Embodiment 2, the material group B mentioned in the paragraphs of Embodiment 1 can be used.

INDUSTRIAL APPLICABILITY

As described above, the present invention discloses the contents of the technology which can perform the formation of the valve head portion in the hollow engine valve, using the material having particularly high heat resistance, by cold forging. This is the technology which technicians in the art have regarded, so to speak, as "the technology of dreams", that is, the one which they have considered to be ideal, but they have judged to be unachievable at the present time. Accordingly, this technology rendered feasible means to provide a so-called revolutionary method in the method of producing a hollow engine valve.

As stated earlier, the material used in the valve head portion of the hollow engine valve has particularly high hardness. Thus, poor accuracy due to hot forging and heavy working labor involving a waiting time until cooling have to be endured, and a low economic efficiency due to the need for soonest replacement of a gun drill having cemented carbide blades has to be tolerated, in forming the valve head portion. The fact that cold forging of the valve head portion has become possible by the present invention, therefore, has aroused the possibility for refurbishing the line in the plant for the hollow engine valve. That is, a shift has been realized toward a novel manufacturing system which can mass-produce high accuracy hollow engine valves rationally and inexpensively by simple equipment.

The engine valve essentially accompanies an engine, and is used not only in engines for vehicles such as passenger cars and trucks, but also in engines for airplanes and engines for ships. Particularly for an exhaust valve, a hollow engine valve having sodium enclosed therein is often used. Thus, the method for production of the hollow engine valve of the present invention can be one which provides an epoch-making technical innovation in the engine manufacturing process.

In an intake valve as well as in an exhaust valve, the adoption of a hollow engine valve leads to the weight reduction of the entire engine, and also results in cost reduction attributed to the rationalization of the materials. Thus, a future trend seems to be toward the hollowing of the engine valve in an intake valve as well. In such a stream, the present invention is expected to have great industrial applicability in industries concerned with the production of engines.

DESCRIPTION OF THE NUMERALS

1 Valve head portion
1a Diameter-increased section
1b Barrel section
11 Semifinished product
11a Intermediate work
11m Intermediate work
11n Intermediate work
111 Diameter-increased section
111a Diameter-increased section
111m Diameter-increased section
111n Diameter-increased section
112 Barrel section
112a Barrel section
112m Barrel section
112n Barrel section
2 Hollow shaft portion
20 Hollow shaft portion
2A Solid round bar
2B Intermediate member
2c Hollow hole
3 Shaft end sealing material
3A Solid round bar
3B Intermediate member
3C Diameter-increased section
D1 Die
D2 Die
D(m−1) Die
Dm Die
D(n−1) Die
M1 Forming hole
M2 Forming hole
M(m−1) Forming hole
Mm Forming hole
M(n−1) Forming hole
PB Press bed
RM Ram
S Hollow hole
SS Hollow hole
S1 Hollow hole
S11 Hollow hole
S11a Hollow hole
S11m Hollow hole
S11n Hollow hole
S2 Hollow hole
S20 Hollow hole
V Hollow engine valve W Hollow engine valve
h11 Height
h12 Height
h13 Height
h14 Height
h15 Height
h16 Height
h17 Height
h18 Height
h20 Height
h21 Height
h22 Height
h30 Height
h31 Height
φ10 Outer diameter
φ11 Inner diameter
φ12 Maximum outer diameter
φ13 Inner diameter
φ14 Outer diameter

The invention claimed is:

1. A hollow engine valve, comprising:
a hollow shaft portion sealed at one end; and
a valve head portion of a single-piece material attached to another end of the hollow shaft portion;
the single-piece material being a material having heat resistance comparable to or better than the heat resistance of a material for the hollow shaft portion;
the valve head portion comprising a cylindrical barrel section and a diameter-increased section at one end of the barrel section, the diameter-increased section including a bottom section;
a valve head portion hollow hole opening at a side attached to the hollow shaft portion, the valve head portion hollow hole having a first inner surface, at the diameter-increased section, having an inner diameter that increases as the first inner surface extends toward the bottom section, and a second inner surface at the bottom of the valve head portion hollow hole; and
the maximum diameter of the valve head portion hollow hole being larger than a maximum outer diameter of the hollow shaft portion; and
the first inner surface and the second inner surface forming a single continuous curved surface.

2. A hollow engine valve as in claim 1, wherein the increased-diameter portion of the valve head is formed by cold forging.

3. A hollow engine valve as in claim 1, wherein said barrel section of said valve head portion is narrowed down to its final diameter by cold forging.

4. A hollow engine valve as in claim 1, wherein the hollow shaft portion comprises a hollow shaft open at both ends, a sealing material is attached to one end of said hollow shaft, and said valve head portion is attached to the other end of said hollow shaft.

5. A hollow engine valve as in claim 1, wherein the valve head portion is formed from material selected from the group comprising nickel-based steel and austenitic manganese-based steel.

6. A hollow engine valve as in claim 1, wherein the valve head portion is formed from material selected from martensitic stainless steel.

7. A hollow engine valve as in claim 1, wherein the valve head portion is formed from material selected from heat-resistant steel.

* * * * *